United States Patent
Lee et al.

(10) Patent No.: US 7,929,216 B2
(45) Date of Patent: Apr. 19, 2011

(54) COLLIMATE LENS ASSEMBLY

(75) Inventors: Young-chol Lee, Hwaseong-si (KR); Seok-chan Hong, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 12/558,867

(22) Filed: Sep. 14, 2009

(65) Prior Publication Data
US 2010/0157434 A1     Jun. 24, 2010

(30) Foreign Application Priority Data

Dec. 23, 2008  (KR) .................. 10-2008-0132575

(51) Int. Cl.
*G02B 27/30* (2006.01)
(52) U.S. Cl. ............................ 359/641; 359/528
(58) Field of Classification Search ............... 359/641
See application file for complete search history.

(56) References Cited

U.S. PATENT DOCUMENTS

| | | | | |
|---|---|---|---|---|
| 4,698,730 A | * | 10/1987 | Sakai et al. | 362/311.05 |
| 2006/0209558 A1 | | 9/2006 | Chinniah et al. | |
| 2007/0278512 A1 | | 12/2007 | Loh et al. | |
| 2009/0268469 A1 | * | 10/2009 | Huang et al. | 362/308 |
| 2010/0059767 A1 | * | 3/2010 | Kawasaki et al. | 257/89 |

FOREIGN PATENT DOCUMENTS

| | | |
|---|---|---|
| GB | 319 661 A | 10/1930 |
| WO | 02/071812 A2 | 9/2002 |
| WO | 2008/017718 A1 | 2/2008 |

* cited by examiner

*Primary Examiner* — David N Spector
*Assistant Examiner* — James C Jones
(74) *Attorney, Agent, or Firm* — Sughrue Mion, PLLC

(57) ABSTRACT

A collimate lens assembly is provided which includes the first collimate lens which has a total reflection surface and a plurality of refracting surfaces, and the second collimate lens which is connected to the hole, and the second collimate lens has a greater refraction ratio than the first collimate lens.

17 Claims, 6 Drawing Sheets

COLLIMATE LENS ASSEMBLY

CROSS-REFERENCE TO RELATED APPLICATIONS

This application claims priority under 35 U.S.C. §119 from Korean Patent Application No. 10-2008-0132575, filed on Dec. 23, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to a light source apparatus of an image display apparatus, and more particularly, to a collimate lens assembly which collimates illumination light of a light source.

2. Description of the Related Art

In general, in an image display apparatus such as a beam projector, a light source apparatus is installed to generate illumination light, and in the light source apparatus, a collimate lens assembly is installed to collimate illumination light irradiated from the light source. The collimate lens assembly bends and reflects the illumination light irradiated from the light source, forms parallel light, and project the light on an image apparatus such as a Digital Micro-mirror Device (DMD).

Halogen lamps have been widely used as a light source, but these days, metal halide lamps or xenon lamps are being used more frequently than halogen lamps because halogen lamps consume more electric power and heating energy. In particular, in the case of small-sized image display apparatuses such as a portable beam projector, a light source apparatus having a light emitting diode (LED) as a light source is often used.

However, a LED light source is darker than a related-art light source, and thus the light source occupies a large area of an image display apparatus comprising the light source. If the area of the light source increases, the size of a collimate lens assembly should also be increased in order to maintain a certain level of a condensing efficiency. Consequently, the volume of the light source apparatus increases, and thus there is a need to resolve this issue.

BRIEF DESCRIPTION OF THE DRAWINGS

The above and/or other aspects of the present invention will be more apparent by describing certain exemplary embodiments of the present invention with reference to the accompanying drawings, in which.

SUMMARY OF THE INVENTION

Figure 1:
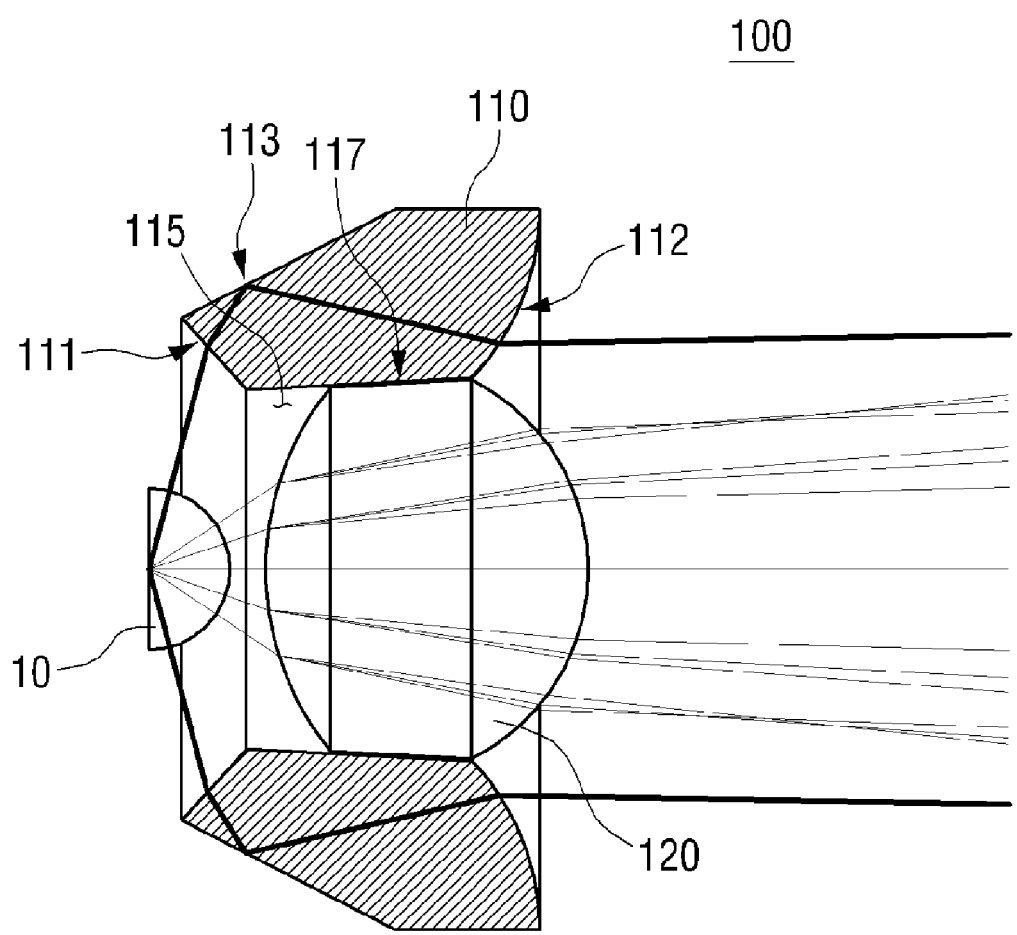
FIG. 1 is a side sectional view of a collimate lens assembly according to an exemplary embodiment of the present invention.

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a small-scale collimate lens assembly which has an enhanced condensing efficiency.

A collimate lens assembly, according to an exemplary embodiment of the present invention, includes a first collimate lens which has a total reflection surface and a plurality of refracting surfaces and a hole at the center, and a second collimate lens which is connected to the hole, and the second collimate lens has a greater refraction ratio than the first collimate lens.

The first collimate lens and the second collimate lens may have different materials from each other, and the first collimate lens may be made of plastic materials and the second collimate lens may be made of glass materials.

The total reflection surface may be reflection-coated or may be formed to satisfy the conditions for total reflection of light.

The plurality of refracting surfaces include a first refracting surface which refracts light irradiated from a light source and a second refracting surface which refracts light refracted from the total reflection surface, and the second refracting surface may be formed one of aspheric, flat, and curved surfaces.

The first and the second collimate lens may be combined by an ultraviolet (UV) bond.

DETAILED DESCRIPTION OF EXEMPLARY EMBODIMENTS OF THE INVENTION

Certain exemplary embodiments of the present invention will now be described in greater detail with reference to the accompanying drawings.

In the following description, the same drawing reference numerals are used for the same elements even in different drawings. The matters defined in the description, such as the detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

Figure 2:
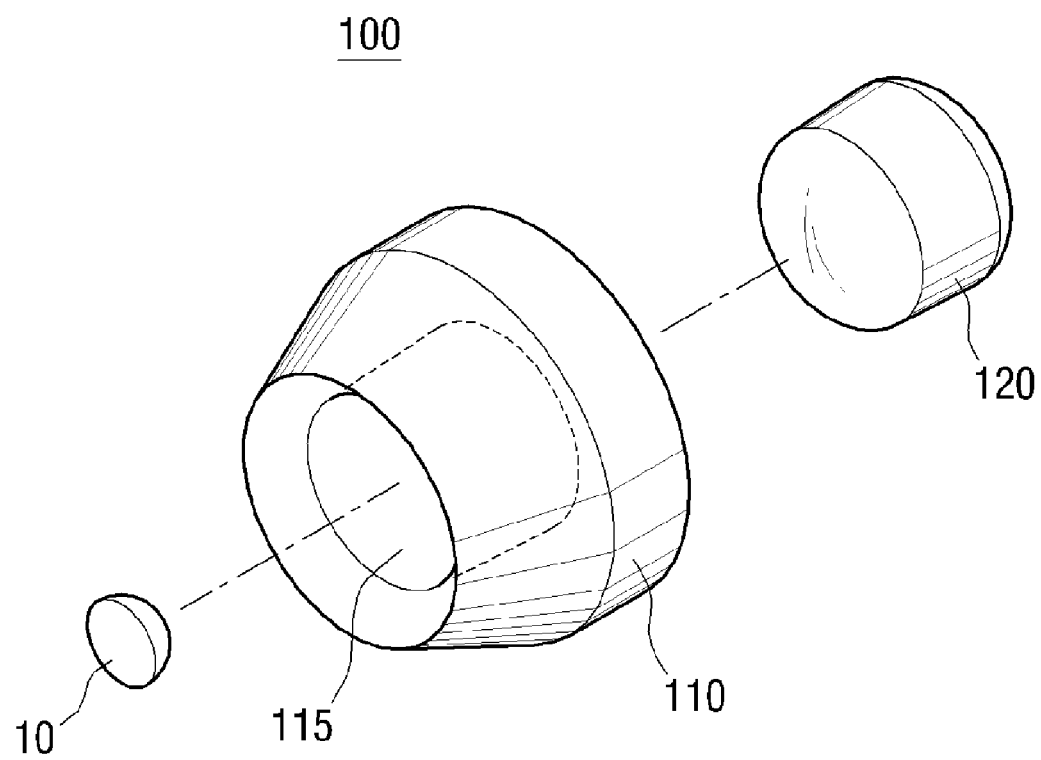
FIG. 2 is a perspective view of FIG. 1, according to an exemplary embodiment of the present invention.

FIG. 1 is a side sectional view of a collimate lens assembly according to an exemplary embodiment of the present invention, and FIG. 2 is a perspective view of FIG. 1. The reference numeral 10 represents an LED light source.

The collimate lens assembly 100 of the present exemplary embodiment condenses light of the LED light source 10 and comprises the first collimate lens 110 and the second collimate lens 120 as illustrated in FIGS. 1 and 2.

The first collimate lens 110 forms a "O" shape with a hole 115 at the center, and includes a first refracting surface 111, a second refracting surface 112 and a total reflection surface 113.

The first refracting surface 111 faces the LED light source 10, and refracts illumination light irradiated from the LED light source 10 at a certain angle so that the illumination light to reach the total reflection surface 113. The angle of incidence may change depending on whether the total reflection surface 113 is coated or not, and if the surface is not coated, the angle of incidence may be formed to satisfy the conditions for total reflection according to the texture of the first collimate lens 110.

The second refracting surface 112 refracts the illumination light reflected via the total reflection surface 113 to form a parallel light, and has the refraction ratio which allows the angle proportion of the refracted illumination light to be within a certain area. In order to do so, the second refracting surface 112 may form one of aspheric, flat, and curved surface, and a designer may select one of them depending on the type of light source and the volume of an optical system.

The second refracting surface 112 of the present exemplary embodiment has an aspheric surface, and the illumination light refracted by the second refracting surface 112 is condensed on an image formation surface within the range of ±20 degrees.

The total reflection surface 113 is formed to have an angle which satisfies the conditions for total reflection of light penetrating materials, and can be used without coating the surface. However, the surface may be coated with reflecting material, if necessary.

The hole 115 is penetrably formed at the center of the first collimate lens 110, and is preferably, but not necessarily, formed in a location which faces the LED light source 10. The diameter of the hole 115 may be at least greater than the diameter of the LED light source 10.

The second collimate lens 120 is formed to have the same diameter as the hole 115 which is formed at the center of the first collimate lens 110, and is connected or fixed to the hole 115 by an ultraviolet (UV) bond 117.

The second collimate lens 120 is formed to have a greater refraction ratio than the refraction ratio of the first collimate lens 110. The second collimate lens 120 may be formed to have a relatively higher refraction ratio to collimate the illumination light of the LED light source 10 more efficiently.

As described above, in order for the first collimate lens 110 and the second collimate lens 120 to have different refraction ratios, the first collimate lens 110 and the second collimate lens 120 may be made of different materials. Preferably, but not necessarily, the first collimate lens 110 is made of a plastic material such as Polymethyl Methacrylate (PMMA) and ZENOR, and the second collimate lens 120 is made of a glass material.

If the first collimate lens 110 is made of a plastic material, it is easy to form the first refraction surface 111 and the second refraction surface 112, and it is also easier to form the total reflection surface 113 which satisfies the conditions for total reflection.

As described above, if the first collimate lens 110 and the second collimate lens 120 are made of different materials, and the second collimate lens 120 has a greater refraction ratio compared with the first collimate lens 110, the condensing efficiency can be enhanced even though the collimate lens assembly 100 is formed smaller than before.

That is, if the second collimate lens 120 disposed in a position corresponding to the LED light source 10 is formed to have a greater refraction ratio than that of the first collimate lens 110, the illumination light irradiated from the LED light source 10 forms parallel light, having a minimum angle change towards a central light axis of the LED light source 10. Therefore, the illumination light is condensed almost perpendicular to the image formation surface, and as a result, the collimating efficiency can be enhanced.

FIG. 3 to 6 illustrate experimental proportions of a condensing efficiency according to an exemplary embodiment of the present invention.

In the above experiment, the properties of the first collimate lens 110 are as follows: K of the first refracting surface 111 is 0.40834 and the radius is 5.4535, and K of the second refracting 112 is 0.017438 and the radius is 5.2287. The properties of the second collimate lens 120 are as follows: K of the surface which illumination light enters is 0.30339, the radius is 5.4116, and K of the surface which the illumination light reaches is 0.13067 and the radius is 4.1611. Here, K represents a constant for keratometry.

Figure 3:
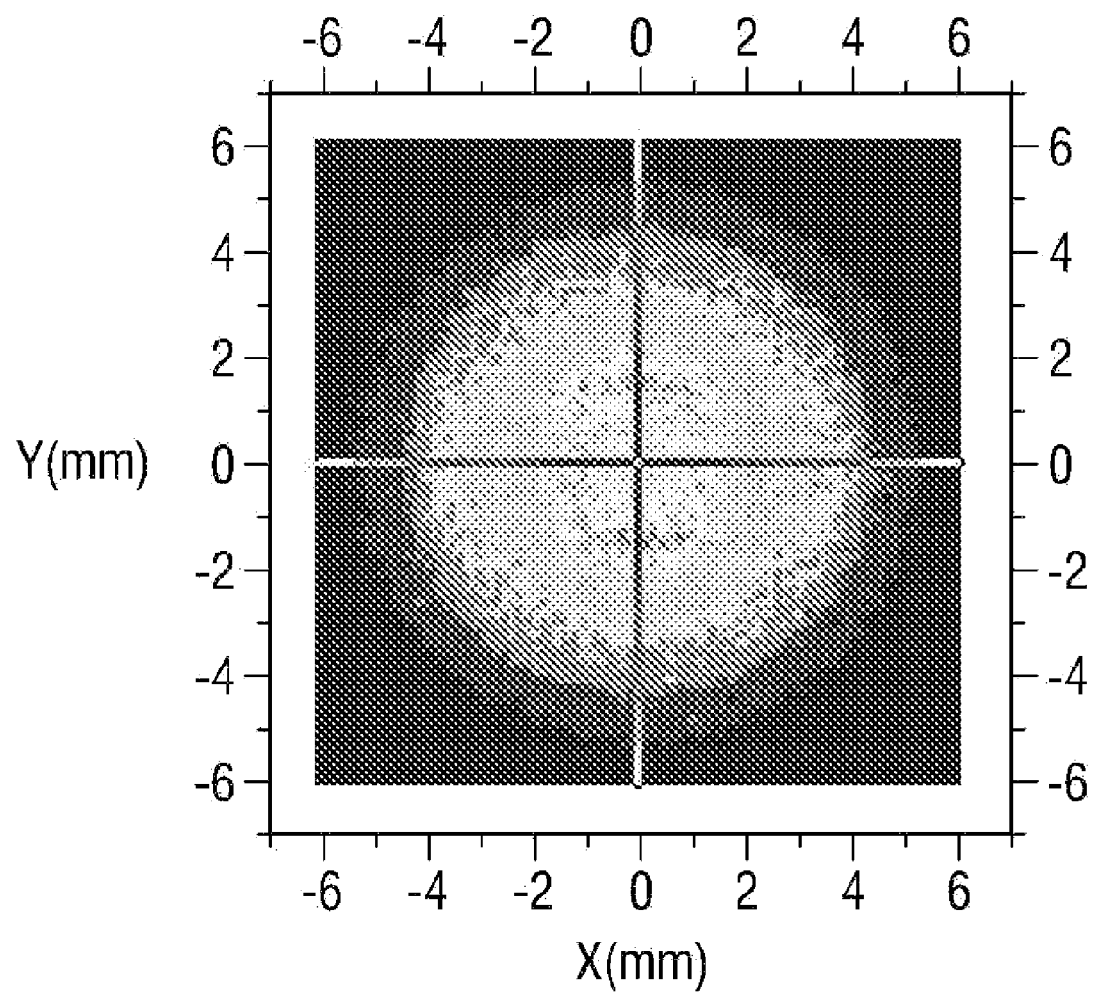
FIG. 3 to FIG. 6 are views illustrating optical properties according to exemplary embodiment of the present invention.
Figure 4:
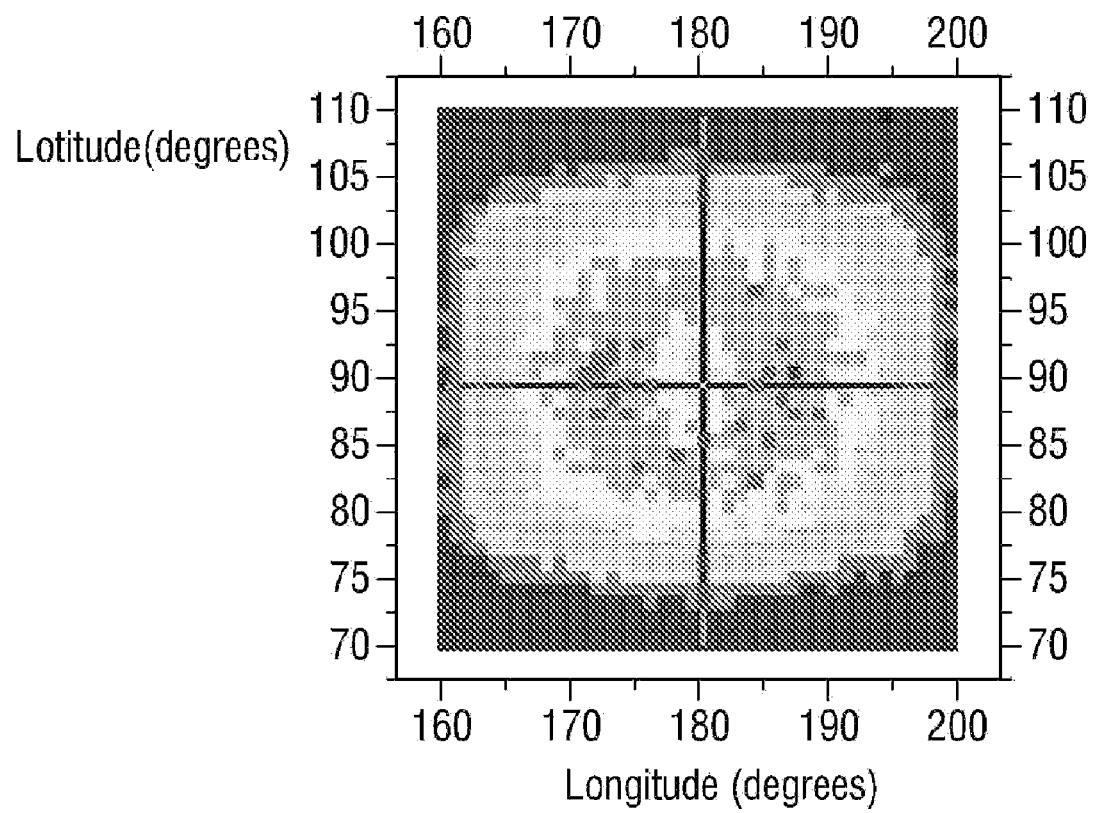
Figure 5:
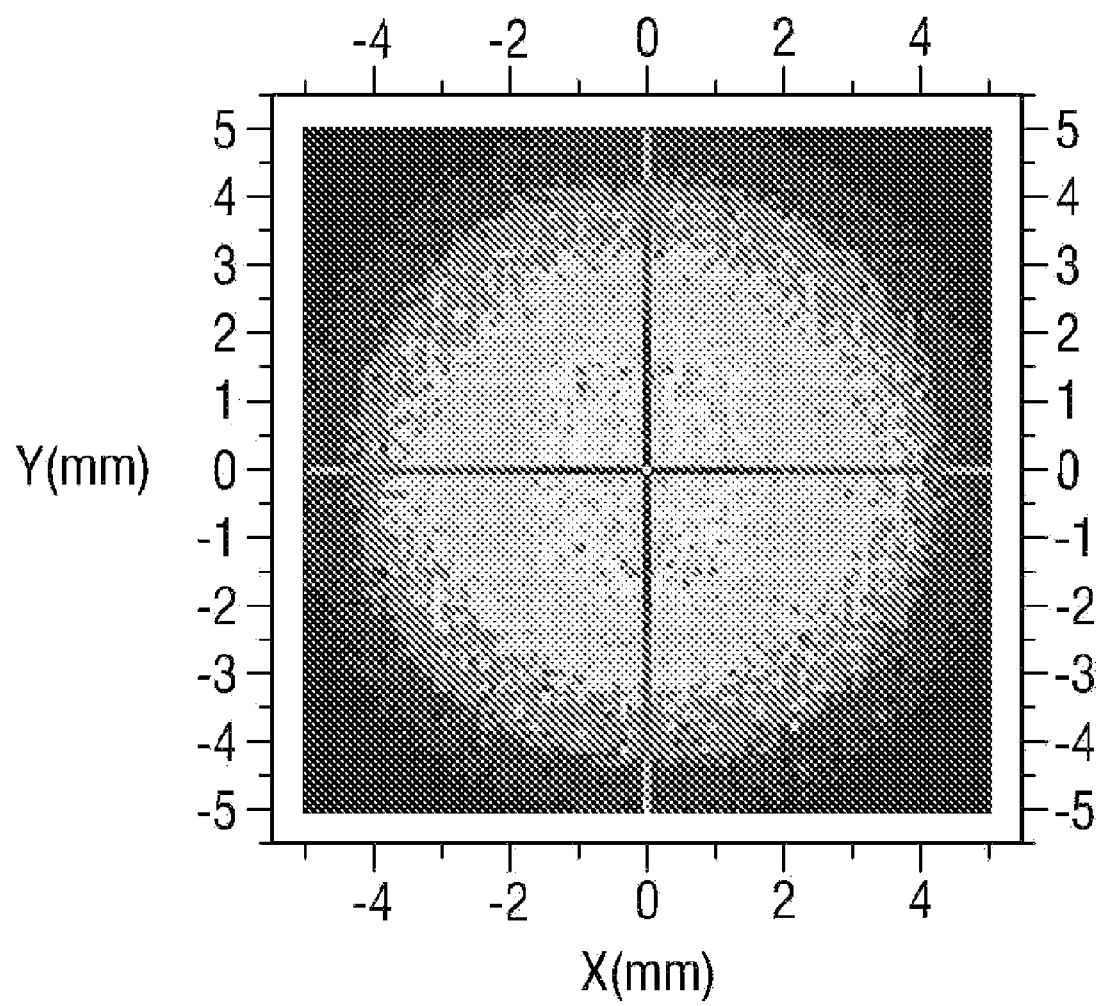
Figure 6:
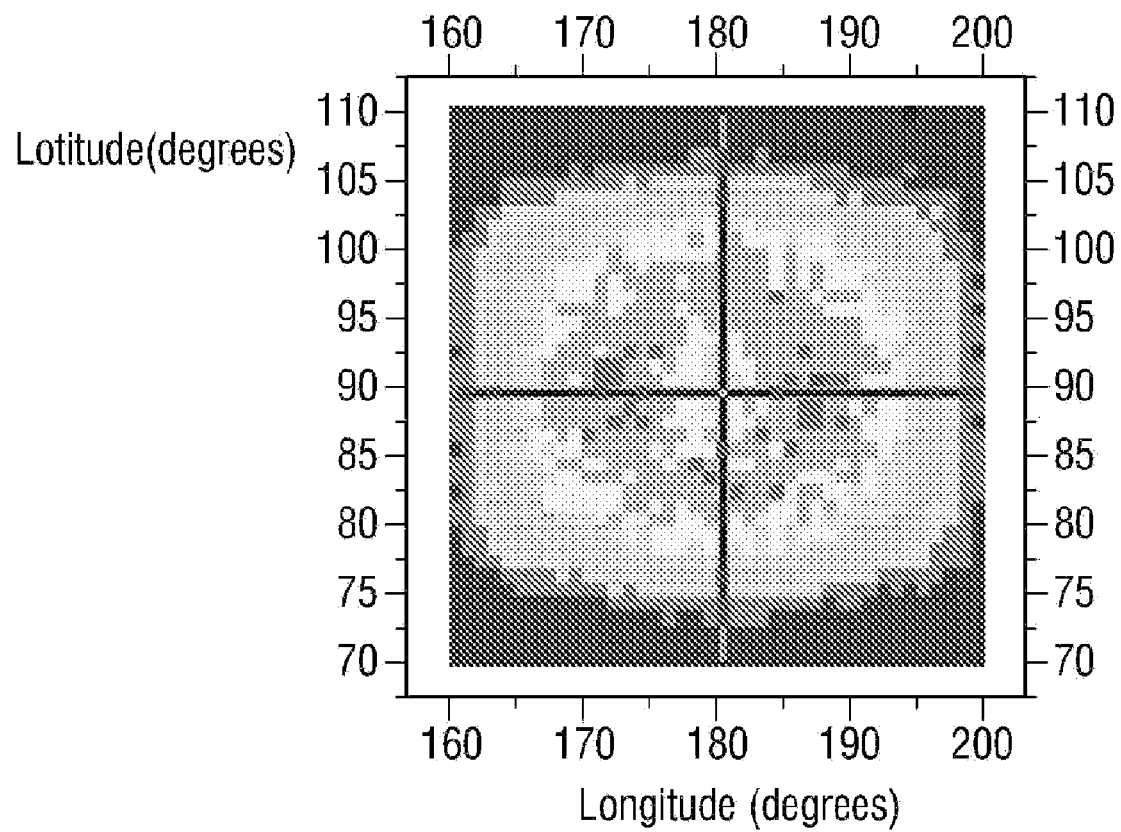

FIGS. 3 and 4 are proportions of illumination light and proportions of an illumination light angle to illustrate a condensing efficiency in a full aperture size of a collimate lens (12×12 mm), and FIGS. 5 and 6 are proportions of illumination light and proportions of an illumination light angle to illustrate a condensing efficiency in an effective aperture size of a collimate lens (10×10 mm).

The above proportions can be summarized as follows.

TABLE 1

| | full aperture size (12 × 12 mm) | effective aperture size (10 × 10 mm) |
|---|---|---|
| Illumination light proportion (%) | 97.6 | 94.55 |
| Illumination light angle proportion (%) | 94.33 | 91.0 |

As shown in Table 1, the present exemplary embodiment shows excellent illumination light proportions and illumination light angle proportions.

As described above, if the collimate lens assembly 100 is formed by combining the first collimate lens 110 and the second collimate lens 120 which have different materials and refraction ratios, the refraction ratio of the collimate lens assembly 100 can be diversely adjusted depending on the condition of a system.

In addition, as it is possible to increase the refraction ratio of a collimate lens which faces the light source with a large area such as an LED light source, the condensing efficiency in the surface where illumination is projected can be improved.

Also, although the volume of a collimate lens is reduced compared to a conventional collimate lens assembly used for an LED light source, the condensing efficiency can be greatly enhanced.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A collimate lens assembly, comprising:
   a first collimate lens which comprises a total reflection surface, a plurality of refracting surfaces, and has a hole formed at a center;
   a second collimate lens which is disposed in the hole of the first collimate lens;
   wherein the second collimate lens has a greater refraction ratio than the first collimate lens, and
   wherein the first and second collimate lenses do not exchange light with each other.

2. The collimate lens assembly as claimed in claim 1, wherein the first collimate lens and the second collimate lens comprise different materials from each other.

3. The collimate lens assembly as claimed in claim 1, wherein the first collimate lens comprises a plastic material, and the second collimate lens comprises a glass material.

4. The collimate lens assembly as claimed in claim 3, wherein the plastic material comprises at least one of Polymethly Methacrylate (PMMA) and ZENOR.

5. The collimate lens assembly as claimed in claim 1, wherein the total reflection surface is reflection-coated.

6. The collimate lens assembly as claimed in claim 1, wherein the plurality of refracting surfaces comprise:

a first refracting surface which refracts light irradiated from a light source; and a second refracting surface which refracts the light refracted from the total reflection surface.

7. The collimate lens assembly as claimed in claim 6, wherein the light refracted at the first refracting surface is incident on the total reflection surface.

8. The collimate lens assembly as claimed in claim 7, wherein the light source is a light emitting diode.

9. The collimate lens assembly as claimed in claim 6, wherein a diameter of the hole is the same as a diameter of the second collimate lens and greater than a diameter of the light source.

10. The collimate lens assembly as claimed in claim 6, wherein the second refracting surface is formed as an aspheric surface.

11. The collimate lens assembly as claimed in claim 6, wherein the second refracting surface is formed as a flat surface.

12. The collimate lens assembly as claimed in claim 6, wherein the second refracting surface is formed as a curved surface.

13. The collimate lens assembly as claimed in claim 1, wherein the first and the second collimate lens are combined by an ultraviolet bond.

14. A collimate lens assembly comprising:
   a first collimate lens which comprises a first refracting surface, a total reflection surface and a second refracting surface, and has a hole formed at a center;
   a second collimate lens that is disposed in the hole to face a light source that irradiates light on the first and second collimate lenses;
   wherein the second collimate lens has a greater refraction ratio than the first collimate lens,
   wherein light irradiated from the light source is incident on the first refracting surface to be refracted and incident on the total reflection surface where the incident light is total-reflected, and
   wherein the total-reflected light is incident on the second refracting surface to be substantially parallel with light irradiated on the second collimate lens from the light source and output from the second collimate lens.

15. The collimate lens assembly of claim 14, wherein the total reflection surface has a total reflection angle with respect to the light incident on the total reflection surface or is reflection-coated to control the light incident on the total reflection surface to be totally reflected.

16. The collimate lens assembly of claim 14, wherein the first collimate lens comprises a material different from a material constituting the second collimate lens.

17. The collimate lens assembly of claim 14, wherein the first collimate lens comprises a plastic material, and the second collimate lens comprises a glass material.

* * * * *